US005443564A

United States Patent [19]

Reaves

[11] Patent Number: 5,443,564
[45] Date of Patent: Aug. 22, 1995

[54] TIE ROD LOOSENING TOOL FOR USE WITH A TIE ROD ASSEMBLY

[76] Inventor: Donald G. Reaves, 2641 Eaton Rapids Rd., Lansing, Mich. 48910

[21] Appl. No.: 227,594

[22] Filed: Apr. 14, 1994

[51] Int. Cl.[6] .............................................. F16B 35/00
[52] U.S. Cl. ..................................... 173/200; 411/389; 411/401
[58] Field of Search ................ 173/200, 114; 411/401, 411/389, 424

[56] References Cited

U.S. PATENT DOCUMENTS

| | | | |
|---|---|---|---|
| 1,282,538 | 10/1918 | Cadwallader, Jr. | 411/401 |
| 2,425,935 | 8/1947 | Hayman | 411/389 |
| 2,503,189 | 4/1950 | Biba, Jr. . | |
| 3,333,555 | 8/1967 | Kapnek | 411/389 |
| 3,654,832 | 4/1972 | Lana . | |
| 4,304,503 | 12/1981 | Gehring et al. | 411/389 |
| 4,369,678 | 1/1983 | Cooper et al. . | |
| 4,569,259 | 2/1986 | Rubin et al. . | |
| 4,685,848 | 8/1987 | Langer . | |
| 4,854,311 | 8/1989 | Steffee | 411/389 |
| 4,962,901 | 10/1990 | Shirley et al. | 411/401 |
| 5,019,080 | 5/1991 | Hemer . | |
| 5,156,509 | 10/1992 | Wu . | |
| 5,207,132 | 5/1993 | Goss et al. . | |

*Primary Examiner*—Scott A. Smith
*Attorney, Agent, or Firm*—Gifford, Krass, Groh, Sprinkle, Patmore, Anderson & Citkowski

[57] ABSTRACT

A tie rod loosening tool for use with a tie rod assembly, the tie rod assembly having an outer tie rod, an inner tie rod and a threaded adjustment sleeve extending from the inner tie rod and being received within the outer tie rod. An elongated tool member is provided upon removal of a standard threaded bolt which secures the outer tie rod to the adjustment sleeve during normal operation The tool member has a first externally threaded end for threadably engaging within an aperture in the outer tie rod. The elongated tool member has a second end which defines a tool bit which may be received within a power tool. The power tool is activated to forcibly loosen, by vibration or jarring, the inner and outer tie rods from the threaded adjustment sleeve and overcomes corrosive buildup between the tie rods and the adjustment sleeve.

7 Claims, 1 Drawing Sheet

TIE ROD LOOSENING TOOL FOR USE WITH A TIE ROD ASSEMBLY

BACKGROUND OF THE INVENTION

1. Field of the Invention

The present invention relates generally to loosening devices and, more particularly, to a loosening tool for use with a tie rod assembly.

2. Description of the Prior Art

Conventional tie rod assemblies are well known in the art as a component of an automotive steering mechanism. The tie rod assembly on many cars consists of an inner tie rod, an outer tie rod and a threaded adjustment sleeve which interconnects the inner tie rod to the outer tie rod. A threaded bolt is normally used to secure the adjustment sleeve to the inner and outer tie rods.

The disadvantage of such conventional tie rod assemblies is that the threaded adjustment sleeve tends to corrode into the adjoining metal portions of the outer and inner tie rod ends. This is especially evident after prolonged exposure to water and salt, which are prevalent during winter driving months. Once the corroded portion of the adjustment sleeve is corroded into the inner and outer tie rod ends it is extremely difficult to adjust or remove the inner and outer tie rods when it becomes necessary to repair or replace the ball joint of the outer tie rod, inner tie rod or the rod sleeve.

SUMMARY OF THE PRESENT INVENTION

The present invention is a tie rod sleeve loosening tool for use with a tie rod assembly. The tie rod assembly includes an outer tie rod, an inner tie rod and a threaded adjustment sleeve extending between the inner tie rod and the outer tie rod which is engaged within opposing ends of the inner tie rod and outer tie rod. A first clamping portion and a second clamping portion extend from the outer tie rod in proximity to the point at which the threaded adjustment sleeve is engaged.

A conventional bolt member is inserted through apertures in the first and second clamping portions and draws the first and second clamping portions of the outer tie rod around the threaded adjustment sleeve. Upon removal of the bolt member, the metal of the adjustment sleeve is often corroded into the adjoining metal portions of the outer tie rod making it extremely difficult to adjust the threaded sleeve when doing a steering alignment or when replacing the inner and outer tie rods or tie rod sleeve.

An elongated tool member is provided and has a first threaded end which is inserted within the apertures of the clamping portions in the space normally occupied by the bolt. The tool member has a second bit portion end which receives a power tool. The power tool is preferably an air hammer which is activated to apply impact forces to the tool member and, consequently, to the tie rod assembly to forcibly loosen the corroded portions between the adjustment sleeve and the outer and inner tie rods. Accordingly, the resistive forces resulting from corrosive buildup between the adjustment sleeve and the adjoining portions of the outer and inner tie rods are overcome, permitting the tie rod sleeve to be able to be turned or to replace the tie rods or sleeve.

BRIEF DESCRIPTION OF THE DRAWING

Reference will now be made to the attached drawing, when read in combination with the following specification, wherein like reference numerals refer to like parts throughout the several views, and in which.

DESCRIPTION OF THE PREFERRED EMBODIMENT

Figure 1:
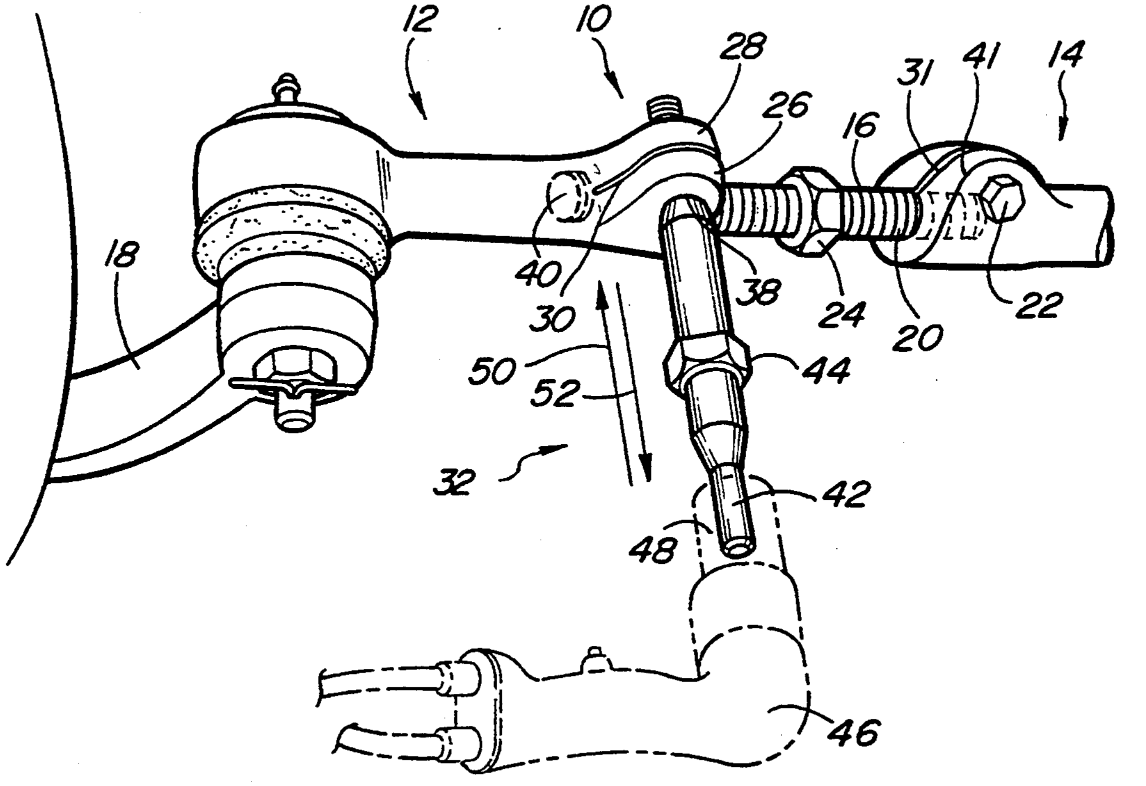
FIG. 1 is a perspective view of the tie rod loosening tool of the present invention in use with a conventional tie rod assembly.
Figure 2:
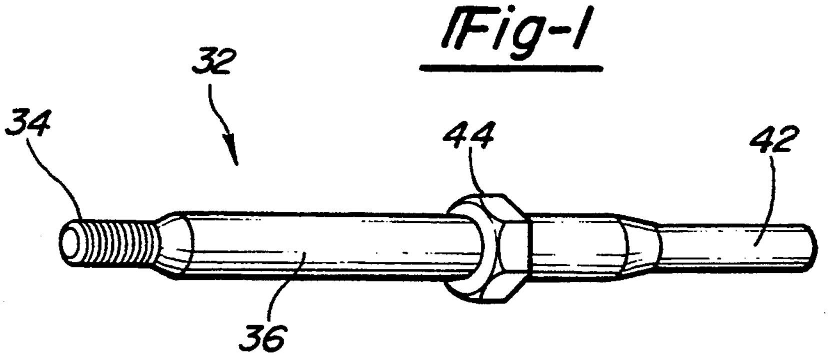
FIG. 2 is a view of the elongated tool member of the present invention.

Referring now FIGS. 1 and 2, a tie rod loosening tool 10 for use with a tie rod assembly is shown. The tie rod assembly is of the type normally used in the steering mechanism of many vehicles and includes an outer tie rod 12, an inner tie rod 14, and a threaded adjustment sleeve 16 which extends from the inner tie 14 rod and is received within the outer tie rod 12. The threaded adjustment sleeve 16 defines a length between the inner tie rod and the outer tie rod and is adjustable to modify this length.

The outer tie rod 12 terminates in a ball joint assembly which is connected to a steering arm 18 of a front wheel of a vehicle, as is customary in the art. The threaded adjustment sleeve 16 is secured to the inner tie rod 14, at 20. Preferably, a bolt 22 is inserted through an aperture in the inner tie rod 14 in proximity to the threaded adjustment sleeve 16 so as to secure the adjustment sleeve to the inner tie rod. The threaded adjustment sleeve has a nut 24 integrally formed at a predetermined position along the length of the adjustment sleeve 16 which may be rotated to adjust the position of the sleeve relative to the inner and outer tie rods by having the threads on the sleeve portion engage like threads which may be positioned along the walls of the aperture of the inner tie rod as is known in the art.

A standard threaded bolt, not shown, engages with a first clamping portion 26 and a second clamping portion 28 which are integrally formed with and extend from the outer tie rod 12 in proximity to the threaded sleeve portion 16 to secure the outer tie rod to the adjustment sleeve The standard bolt is well known in the art as a means for securing together the outer and inner tie rods and the adjustment sleeve and is not part of the present invention. The circular circumference of the tie rod 12 terminates in the oppositely facing clamping portions 26 and 28 such that the clamping portions create a longitudinal space 30 which extends a distance along the length of the outer tie rod 12 and a longitudinal space 31 which extends a distance along the length of the inner tie rod 14.

An elongated tool member 32 is provided and is preferably constructed of a hard steel or a durable synthetic polymer. The elongated tool member 32 is substantially cylindrical in shape and includes a first threaded end portion 34. The threaded end portion is preferably of a reduced circumference with respect to a main body portion 36 and has a plurality of spiral-shaped threads placed thereon.

Referring again to FIG. 1, an aperture 38 is formed within the first clamping portion 26 and the second clamping portion 28. Although it is not clearly shown in FIG. 1, the aperture 38 has a solid inner wall through the first clamping portion 26 and an internally threaded wall through the second clamping portion 28. The standard threaded bolt is removed from the clamping portions when it is desirable to adjust the threaded sleeve when doing an alignment or to replace the inner and outer tie rods or the adjustment sleeve. The threaded end portion 34 of the tool member 32 is then inserted through the clamping portions so that the threads on the second clamping portion 28 engage the like configured threads of the threaded end portion 34 of the tool member 32. The tool member 32 therefore engages through both the first and second portions 26 and 28 but does not clamp them together in the same fashion as the conventional threaded fastener bolt.

The threaded adjustment sleeve portion 16 is normally retained within an aperture 40, indicated in phantom, in the outer tie rod 12 and an aperture 41, indicated in phantom, in the inner tie rod 14. The aperture 40 and 41 can likewise have threads placed thereon to engage with the threaded sleeve portion similar to the manner in which the sleeve portion is secured within the inner tie rod 14.

As has been previously described, the portion of the threaded adjustment sleeve secured within the inner and outer tie rods can, over time, become corroded into the adjoining metal portion of the inner and outer tie rods. Such corrosion buildup can create resistive forces that prevent the threaded sleeve from being adjusted or removal of the inner and outer tie rods from the adjustment sleeve when it is desirable to adjust the sleeve 16 when doing an alignment or when replacing the inner and outer tie rods or sleeve.

Once the standard threaded bolt has been removed and the tool member 32 has been inserted through the clamping portions 26 and 28, the inner and outer tie rods can be forcibly loosened from the threaded adjustment sleeve. The elongated tool member 32 further includes a second bit end portion 42 at an end opposite the first threaded end portion 34. The bit end portion 42 is separated from the main body portion 36 of the tool member by a nut portion 44 integrally formed with and extending from the circumferential surface of the main body portion 36. The nut portion 44 is preferably hexagonal or octagonal in shape so as to be capable of being engaged by a wrench or like tool which threadably engages the tool 32 into the clamping portions.

The bit end portion 42 is substantially cylindrical in shape with a circumference lesser than that of the main body portion. Referring again to FIG. 1, a power tool 46 is provided and includes an engaging portion 48 attached to a power driven end thereof. The engaging portion 48 is configured to engage the bit end portion 42 of the tool member. The power tool 46 is preferably an air hammer which delivers longitudinally directed impact forces to the elongated tool member 32. The tool member therefore experiences forces in a first longitudinal direction 50 and opposite responsive forces in a second longitudinal direction 52 which are transferred to the inner and outer tie rods and adjustment sleeve and which forcibly loosen corrosive buildup between the adjustment sleeve and the inner and outer tie rods.

Corrosive buildup normally results from water and salt which corrode the connection between the threaded adjustment sleeve in the apertures 40 and 41 and the adjoining metal of the outer and inner tie rods. This is particularly prevalent where the adjustment sleeve and tie rods are constructed of a steel or like metal which can corrode over time.

Accordingly, the present invention provides a novel and useful way of overcoming corrosive build-up between an adjustment sleeve and an outer and inner tie rod so as to permit the adjustment sleeve to be turned or to remove the inner and/or outer tie rods from the sleeve once the threaded bolt for securing the tie rod assembly together has been removed.

Having described my invention additional embodiments will become apparent to those skilled in the art to which it pertains without deviating from the scope of the invention as defined by the appended claims.

I claim:

1. A combination tie rod loosening tool and tie rod assembly, comprising:

an outer tie rod, an inner tie rod and a threaded adjustment sleeve extending from the inner tie rod which is received within the outer tie rod; and a tool member having an elongated body with a first end for engaging with an appropriately formed aperture in said outer tie rod, said tool member having a second end which substantially defines a tool bit capable of being received within an engaging portion of a power tool;

wherein the power tool is activated to introduce impact force to said elongated tool member which are transferred from the outer tie rod to the adjustment sleeve and the inner tie rod in order to overcome corrosive buildup between the inner and outer tie rods and the adjustment sleeve.

2. The combination tie rod loosening tool and tie rod assembly according to claim 1, wherein said aperture in said outer tie rod comprises a first clamping portion and a second clamping portion extending from the outer tie rod in proximity with the adjustment sleeve, said clamping portions defining a longitudinal open space which extends therebetween for a predetermined distance along the outer tie rod.

3. The combination tie rod loosening tool and tie rod assembly according to claim 2, further comprising a continuous aperture having a solid internal wall formed through said first clamping portion and a threaded internal wall formed through said second clamping portion.

4. The combination tie rod loosening tool and tie rod assembly according to claim 1, wherein said tool member further comprises an integrally formed nut portion located at a position along a length of said elongated body of said tool member.

5. The combination tie rod loosening tool and tie rod assembly according to claim 1, wherein said tool member is substantially cylindrical in shape and is constructed of steel.

6. The combination tie rod loosening tool and tie rod assembly according to claim 1, wherein said tool member is substantially cylindrical in shape and is constructed of a durable synthetic polymer.

7. The combination tie rod loosening tool and tie rod assembly according to claim 1, wherein said power tool for engaging said tool bit end is an air hammer which delivers longitudinal impact forces so as to loosen the outer tie rod from the adjustment sleeve.

* * * * *